(12) United States Patent
Wang et al.

(10) Patent No.: US 12,235,751 B2
(45) Date of Patent: Feb. 25, 2025

(54) APPLICATION DEBUGGING METHOD, APPARATUS, DEVICE, AND MEDIUM

(71) Applicant: Huawei Cloud Computing Technologies Co., Ltd., Guizhou (CN)

(72) Inventors: Yawei Wang, Shanghai (CN); Noam Peretz, Hod Hasharon (IL); Guy Segev, Hod Hasharon (IL); Eviatar Huta, Hod Hasharon (IL); Wei Ye, Hangzhou (CN); Qian Wang, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 185 days.

(21) Appl. No.: 17/993,624

(22) Filed: Nov. 23, 2022

(65) Prior Publication Data

US 2023/0087995 A1  Mar. 23, 2023

Related U.S. Application Data

(63) Continuation of application No. PCT/CN2021/100195, filed on Jun. 15, 2021.

(30) Foreign Application Priority Data

May 26, 2020 (CN) .......................... 202010456122.7
Sep. 9, 2020 (CN) .......................... 202010940931.5

(51) Int. Cl.
 *G06F 9/44* (2018.01)
 *G06F 11/36* (2006.01)
(52) U.S. Cl.
 CPC .............................. *G06F 11/3664* (2013.01)

(58) Field of Classification Search
 CPC .................................................. G06F 11/3664
 See application file for complete search history.

(56) References Cited

U.S. PATENT DOCUMENTS

| | | |
|---|---|---|
| 6,941,492 B1 | 9/2005 | Ezra et al. |
| 2002/0199173 A1 | 12/2002 | Bowen |

(Continued)

FOREIGN PATENT DOCUMENTS

| | | |
|---|---|---|
| CN | 102222043 A | 10/2011 |
| CN | 107977304 A | 5/2018 |

(Continued)

OTHER PUBLICATIONS

Li Lingling et al., Research and design of software testing process control systems, Software Guide, Apr. 2011, with an English abstract 4 pages.

*Primary Examiner* — Hang Pan
(74) *Attorney, Agent, or Firm* — Conley Rose, P.C.

(57) ABSTRACT

An application debugging method includes an interaction sub-system receiving identifiers of a plurality of application sub-modules that are input or selected by a user, creating debug sessions that are in a one-to-one correspondence with the plurality of application sub-modules, and then generating a plurality of debugging request messages based on the plurality of debug sessions. Each debugging request message is routed by the routing sub-system to an agent of an application sub-module requested to be debugged, to request debugging of a code block of the corresponding application sub-module.

20 Claims, 8 Drawing Sheets

(56) References Cited

U.S. PATENT DOCUMENTS

| | | | |
|---|---|---|---|
| 2003/0051026 A1* | 3/2003 | Carter | H04L 63/0263 |
| | | | 709/224 |
| 2006/0048098 A1* | 3/2006 | Gatlin | G06F 11/321 |
| | | | 717/124 |
| 2007/0113218 A1 | 5/2007 | Nolan et al. | |
| 2008/0133337 A1* | 6/2008 | Fletcher | G06F 16/958 |
| | | | 707/E17.116 |
| 2008/0301502 A1 | 12/2008 | Harsha et al. | |
| 2012/0151452 A1 | 6/2012 | Zinkovsky et al. | |
| 2012/0320912 A1* | 12/2012 | Estrada | H04L 67/146 |
| | | | 370/389 |
| 2015/0169434 A1 | 6/2015 | De Angelis et al. | |
| 2016/0239162 A1 | 8/2016 | Sivasubramanian et al. | |
| 2018/0077062 A1* | 3/2018 | Park | G07C 5/0841 |
| 2019/0213355 A1 | 7/2019 | Raviv et al. | |

FOREIGN PATENT DOCUMENTS

| | | |
|---|---|---|
| CN | 109343878 A | 2/2019 |
| CN | 110297749 A | 10/2019 |
| CN | 110489297 A | 11/2019 |

\* cited by examiner

APPLICATION DEBUGGING METHOD, APPARATUS, DEVICE, AND MEDIUM

CROSS-REFERENCE TO RELATED APPLICATIONS

This is a continuation of International Patent Application No. PCT/CN2021/100195 filed on Jun. 15, 2021, which claims priority to Chinese Patent Application No. 202010940931.5 filed on Sep. 9, 2020 and Chinese Patent Application No. 202010456122.7 filed on May 26, 2020. All of the aforementioned patent applications are hereby incorporated by reference in their entireties.

TECHNICAL FIELD

This disclosure relates to the field of application development technologies, and in particular, to an application debugging method, an apparatus, a device, and a computer-readable storage medium.

BACKGROUND

An application is a collection of computer programs written for a special application purpose of a user. An application usually goes through a plurality of phases, such as development, testing, and rollout, from project initiation to delivery to customers. A corresponding environment is usually configured in each phase of development, testing, and rollout, for example, a development environment, a testing environment, and a production environment.

A developer usually needs to debug the application. The debugging of the application includes detecting an error in program code of the application manually or in a compilation manner, and then correcting the program code based on the error found in a debugging process.

Debugging efficiency of an existing debugging method is usually relatively low, and it is difficult to meet a service requirement. How to efficiently debug applications has become a major concern in the industry.

SUMMARY

This disclosure provides an application debugging method. This method supports debugging of a plurality of application sub-modules of an application at the same time. This improves debugging efficiency. This disclosure further provides a method for processing a debugging request message, an apparatus corresponding to the foregoing method, a device, a computer-readable storage medium, and a computer program product.

According to a first aspect, this disclosure provides an application debugging method. The method may be executed by an application debugging system. The application debugging system is configured to perform code debugging on an application sub-module of an application. The application usually includes a plurality of application sub-modules. The application sub-module is a functional module that implements one or more functions by using a computer-executable code block. The application sub-module may be one or more source code files. The application sub-module can run in a production environment to provide services. In some embodiments, the application sub-module may alternatively be one or more microservices. The microservices run in the production environment to provide corresponding services.

The application debugging system includes a routing sub-system and at least one interaction sub-system. The application debugging system may support one or more users to perform code debugging on the application sub-module of the application by using respective interaction sub-systems. For ease of description, in this embodiment of this disclosure, a process in which a user performs code debugging on the application by using one of at least one interaction sub-system is used as an example for description.

The interaction sub-system receives identifiers of a plurality of application sub-modules that are input or selected by the user, where a code block included in each application sub-module is used to implement a function of the application. The interaction sub-system creates a plurality of debug sessions, where the plurality of debug sessions are in a one-to-one correspondence with a plurality of application sub-modules requested to be debugged. Then, the interaction sub-system generates a plurality of debugging request messages based on debug session identifiers corresponding to the plurality of debug sessions. The plurality of debugging request messages is routed by the routing sub-system to agents of the application sub-modules requested to be debugged, to request debugging of a code block of the corresponding application sub-module.

The debug session is a session used to debug the application sub-module. The debug sessions are in a one-to-one correspondence with the debugged application sub-modules. Each debug session has a unique debug session identifier. The debug session identifier is carried in the debugging request message, so that a connection may be established between the debugging request message and two ends of the debug session, such as the application sub-module and the interaction sub-system. In this way, each debugging request message and a debugging response message for the debugging request message may be transmitted at the two ends of the debug session, and are not transmitted to another application sub-module or interaction sub-system. In this way, the plurality of application sub-modules can be debugged at the same time, and debugging efficiency is improved.

An agent corresponding to each application sub-module is a code block deployed in the production environment together with the application. The code block is used to act as an agent for the application sub-module to interact with the outside and debug the application sub-module during running. The application sub-module (for example, the microservice) generates a process during running, and the agent of the application sub-module is essentially equivalent to an independent thread hosted in the process during running. The routing sub-system routes the debugging request messages generated when the user debugs different application sub-modules to the agents of the corresponding application sub-modules respectively, and the agents start debugging of the application sub-modules based on the debugging request messages. When the application debugging system debugs the application sub-modules of the application, the foregoing process is not blocked, and interaction is directly performed by using the thread hosted in the foregoing process. In this way, the application sub-module of the application can be directly debugged in the production environment. This further improves the debugging efficiency.

In some possible implementations, the interaction sub-system generates a plurality of original debugging request messages based on the identifiers of the plurality of application sub-modules. Then, the interaction sub-system adds, to the plurality of original debugging request messages, debug session identifiers corresponding to application sub-modules requested to be debugged, to obtain the plurality of debugging request messages. In this way, the plurality of debugging request messages may be respectively routed to the agents of the application sub-modules requested to be debugged, so that each agent starts debugging of the corresponding application sub-module based on the debugging request message. This improves debugging efficiency.

In some possible implementations, the interaction sub-system may further create a global debug session. Two ends of the global debug session are the interaction sub-system and the debugged application (for example, the plurality of application sub-modules of the application). A difference between a debug session corresponding to the global debug session and a debug session corresponding to the application sub-module lies in that one global debug session corresponds to a plurality of application sub-modules that are requested to be debugged for one debugging start operation, but one debug session corresponds to one application sub-module that is requested to be debugged. Therefore, one global debug session usually corresponds to the plurality of debug sessions. The global debug session may be used to manage debugging messages of the plurality of application sub-modules that are requested to be debugged for one debugging start operation, for example, filter and aggregate the plurality of debugging response messages.

The global debug session has a unique identifier, and the identifier is referred to as a global debug session identifier. Based on this, the interaction sub-system may add, to the plurality of original debugging request messages, the global debug session identifier and the debug session identifiers that correspond to the application sub-modules requested to be debugged, to generate the plurality of debugging request messages.

Because the plurality of debugging request messages further carries the global debug session identifier, the agent of the application sub-module may also carry the global debug session identifier in the debugging response message. In this way, when receiving the debugging response message, the interaction sub-system may further filter and aggregate a plurality of debugging response messages based on the global debug session identifier, and specifically, filter and aggregate debugging response messages corresponding to different debugging start operations. The interaction sub-system may generate a topology diagram and/or a debugging request response flow diagram of the application sub-modules based on a result obtained after filtering and aggregation, and present the topology diagram and/or the request response flow diagram to the user, so that the user views debugging progress.

In some possible implementations, the interaction sub-system may further receive a plurality of debugging response messages, and the plurality of debugging response messages are in a one-to-one correspondence with the plurality of debugging request messages sent by the interaction sub-system. Debugging of the plurality of application sub-modules may be implemented based on the plurality of debugging response messages. This improves debugging efficiency.

In some possible implementations, the interaction sub-system may further establish a persistent connection to the routing sub-system before sending the plurality of debugging request messages to the routing sub-system. Because of the persistent connection, the debugging request message may be transmitted for a plurality of times. This avoids a waste of resources caused by establishing the connection for a plurality of times.

In some possible implementations, the interaction sub-system may further discard a received debugging request message when the persistent connection fails to be established, for example, may be a received original debugging request message. The debugging request messages (for example, the original debugging request messages) obtained when the interaction sub-system establishes the persistent connection to the routing sub-system may be stored in a dedicated queue, for example, a debugging request queue. When the persistent connection is successfully established, the interaction sub-system creates, based on the original debugging request message, a debug session for the application sub-module requested to be debugged. When the persistent connection fails to be established, the interaction sub-system can discard a received original debugging request message in the queue and refuse to create a corresponding debug session. In this way, unnecessary resource waste is avoided, and resource overheads are reduced.

In some possible implementations, the interaction sub-system may further disconnect the persistent connection to the routing sub-system when no debug session currently exists, for example, a plurality of debug sessions created by the interaction sub-system are closed. This prevents idle network resources and improves resource utilization.

According to a second aspect, this disclosure provides a method for processing a debugging request message. This method may be executed by a debug adapter in an interaction sub-system. The debug adapter is essentially a piece of program code. The program code may be provided to a user in a form of a plug-in, and the user may install the plug-in in an interaction module such as an integrated development environment (IDE) in the interaction sub-system. When the plug-in is executed, a service process independent of the IDE and a programming language framework is generated. The service process of the debug adapter functions as a middle layer between the IDE and a routing sub-system. It is used to listen to a debugging start operation from the IDE and establish a persistent connection to the routing sub-system, for example, a WebSocket connection. The persistent connection may be used to transmit a debugging message, for example, a debugging request message.

The debug adapter receives a plurality of original debugging request messages. Each original debugging request message is used to request to debug one application sub-module of the application, and a code block included in each application sub-module is used to implement a function of the application. Then, the debug adapter creates a plurality of debug sessions, the plurality of debug sessions are in a one-to-one correspondence with the plurality of application sub-modules requested to be debugged. Then, the debug adapter generates a plurality of debugging request messages based on the debug session identifiers corresponding to the plurality of debug sessions and the plurality of original debugging request messages, and sends the plurality of debugging request messages.

According to the method, the plurality of application sub-modules of the application can be debugged at the same time. This improves debugging efficiency and meets service requirements.

In some possible implementations, the debug adapter may add, to the plurality of original debugging request messages, debug session identifiers corresponding to application sub-modules requested to be debugged, to obtain the plurality of debugging request messages. In this way, the plurality of debugging request messages may be respectively routed to the agents of the application sub-modules requested to be debugged, so that each agent starts debugging of the corresponding application sub-module based on the debugging request message. This improves debugging efficiency.

In some possible implementations, the debug adapter may also further a global debug session. The global debug session corresponds to the plurality of debug sessions. Correspondingly, the debug adapter may add, to the plurality of original debugging request messages, a global debug session identifier and the debug session identifiers that correspond to the application sub-modules requested to be debugged, to obtain the plurality of debugging request messages. When receiving the debugging request message, the agent of the application sub-module starts code debugging of the corresponding application sub-module, and generates a debugging response message. The debugging response message carries the global debug session identifier. The global debug session identifier may be used to filter and aggregate a plurality of debugging response messages, to generate a topology diagram and/or a debugging request response flow diagram of the application sub-modules, so that the user views debugging progress.

In some possible implementations, the debug adapter may delete standard message headers of the plurality of original debug request messages, and add updated message headers to the plurality of original debug request messages. The updated message headers include the debug session identifiers corresponding to the application sub-modules requested to be debugged. In this way, on one hand, it can be ensured that the debugging request message can be accurately routed to the agent of the corresponding application sub-module, and on the other hand, additional transmission overheads can be avoided.

In some possible implementations, the debug adapter may further receive a plurality of debugging response messages. The plurality of debugging response messages are in a one-to-one correspondence with the plurality of debugging request messages. Debugging of the plurality of application sub-modules may be implemented based on the plurality of debugging response messages. This improves debugging efficiency.

In some possible implementations, the debug adapter may further delete message headers of the plurality of debugging response messages. The message headers of the plurality of debugging response messages include the debug session identifier. Moreover, the debug adapter adds standard message headers to the plurality of debugging response messages. In this way, on one hand, it can be ensured that the debugging response message can be identified by the interaction module such as the IDE, and on the other hand, additional transmission overheads can be avoided.

In some possible implementations, before sending the plurality of debugging request messages, the debug adapter may further establish a persistent connection to the routing sub-system. The routing sub-system is configured to route the debugging request message to an agent of the application sub-module requested to be debugged. Because of the foregoing persistent connection, the debugging request message may be transmitted for a plurality of times. This avoids a waste of resources caused by establishing the connection for a plurality of times.

In some possible implementations, the debug adapter may further discard a received debug request message when the persistent connection fails to be established, for example, discard the debugging request message in the debugging request queue. In this way, unnecessary resource waste is avoided, and resource overheads are reduced.

In some possible implementations, the debug adapter may further disconnect the persistent connection to the routing sub-system when no debug session currently exists, for example, a plurality of debug sessions created by the debug adapter are closed. This prevents idle network resources and improves resource utilization.

According to a third aspect, this disclosure provides an interaction sub-system. An application debugging system is configured to perform code debugging on an application sub-module of an application. The application debugging system includes a routing sub-system and an interaction sub-system. The interaction sub-system includes: a communications unit, configured to receive identifiers of a plurality of application sub-modules that are input or selected by a user, where a code block included in each application sub-module is used to implement a function of the application; a creation unit, configured to create a plurality of debug sessions, where the plurality of debug sessions are in a one-to-one correspondence with the plurality of application sub-modules; and a generation unit, configured to generate a plurality of debugging request messages based on the plurality of debug sessions, where each debugging request message is routed by the routing sub-system to an agent of an application sub-module requested to be debugged, to request debugging of a code block of the corresponding application sub-module.

In some possible implementations, each debug session includes a debug session identifier, and the generation unit is configured to: generate a plurality of original debugging request messages based on the identifiers of the plurality of application sub-modules; and add, to the plurality of original debugging request messages, debug session identifiers corresponding to application sub-modules requested to be debugged, to obtain the plurality of debugging request messages.

In some possible implementations, the creation unit is further configured to: create a global debug session, where the global debug session corresponds to the plurality of debug sessions.

The generation unit is configured to: add, to the plurality of original debugging request messages, a global debug session identifier and the debug session identifiers that correspond to the application sub-modules requested to be debugged, to generate the plurality of debugging request messages.

In some possible implementations, the communications unit is further configured to: receive a plurality of debugging response messages, where the plurality of debugging response messages are in a one-to-one correspondence with the plurality of debugging request messages.

In some possible implementations, the sub-system further includes: a processing unit, configured to establish a persistent connection to the routing sub-system before the plurality of debugging request messages are sent to the routing sub-system.

In some possible implementations, the processing unit is further configured to: discard a received debugging request message when the persistent connection fails to be established.

In some possible implementations, the sub-system further includes: a processing unit, configured to disconnect the persistent connection to the routing sub-system when the plurality of debug sessions is closed.

According to a fourth aspect, this disclosure provides an apparatus for processing a debugging request message. The apparatus includes: a communications unit, configured to receive a plurality of original debugging request messages, where each original debugging request message is used to request to debug one application sub-module of an application, and a code block included in each application submodule is used to implement a function of the application; a creation unit, configured to create a plurality of debug sessions, where the plurality of debug sessions are in a one-to-one correspondence with a plurality of application sub-modules requested to be debugged; and a generation unit, configured to generate a plurality of debugging request messages based on debug session identifiers corresponding to the plurality of debug sessions and the plurality of original debugging request messages, where the communications unit is further configured to send the plurality of debugging request messages.

In some possible implementations, the generation unit is configured to: add, to the plurality of original debugging request messages, the debug session identifiers corresponding to the application sub-modules requested to be debugged, to obtain the plurality of debugging request messages.

In some possible implementations, the creation unit is further configured to: create a global debug session, where the global debug session corresponds to the plurality of debug sessions.

The generation unit is configured to: add, to the plurality of original debugging request messages, a global debug session identifier and the debug session identifiers that correspond to the application sub-modules requested to be debugged, to obtain the plurality of debugging request messages.

In some possible implementations, the generation unit is configured to: delete standard message headers of the plurality of original debugging request messages; and add updated message headers to the plurality of original debugging request messages, where the updated message headers include the debug session identifiers corresponding to the application sub-modules requested to be debugged.

In some possible implementations, the communications unit is further configured to: receive a plurality of debugging response messages, where the plurality of debugging response messages are in a one-to-one correspondence with the plurality of debugging request messages.

In some possible implementations, the generation unit is configured to: delete message headers of the plurality of debugging response messages, where the message headers of the debugging response messages include the debug session identifiers; and add standard message headers to the plurality of debugging response messages.

In some possible implementations, the apparatus further includes: a processing unit, configured to establish a persistent connection to a routing sub-system, where the routing sub-system is configured to route the debugging request message to an agent of the application sub-module requested to be debugged.

In some possible implementations, the processing unit is further configured to: discard a received debugging request message when the persistent connection fails to be established.

In some possible implementations, the apparatus further includes: a processing unit, configured to disconnect the connection to the routing sub-system when the plurality of debug sessions is closed.

According to a fifth aspect, this disclosure provides a device, where the device includes a processor and a memory. The processor and the memory communicate with each other. The processor is configured to execute instructions stored in the memory, so that the device performs the method according to any one of the implementations of the first aspect or the second aspect.

According to a sixth aspect, this disclosure provides a computer-readable storage medium, where the computer-readable storage medium stores instructions, and the instructions instruct a device to perform the method in any one of the implementations of the first aspect or the second aspect.

According to a seventh aspect, this disclosure provides a computer program product including instructions. When the computer program product runs on a device, the device is enabled to perform the method in any implementation of the first aspect or the second aspect.

In this disclosure, based on the implementations provided in the foregoing aspects, further combination may be performed to provide more implementations.

BRIEF DESCRIPTION OF DRAWINGS

To describe the technical methods in the embodiments of this disclosure more clearly, the following briefly describes the accompanying drawings used in describing the embodiments.

DESCRIPTION OF EMBODIMENTS

Figure 1:
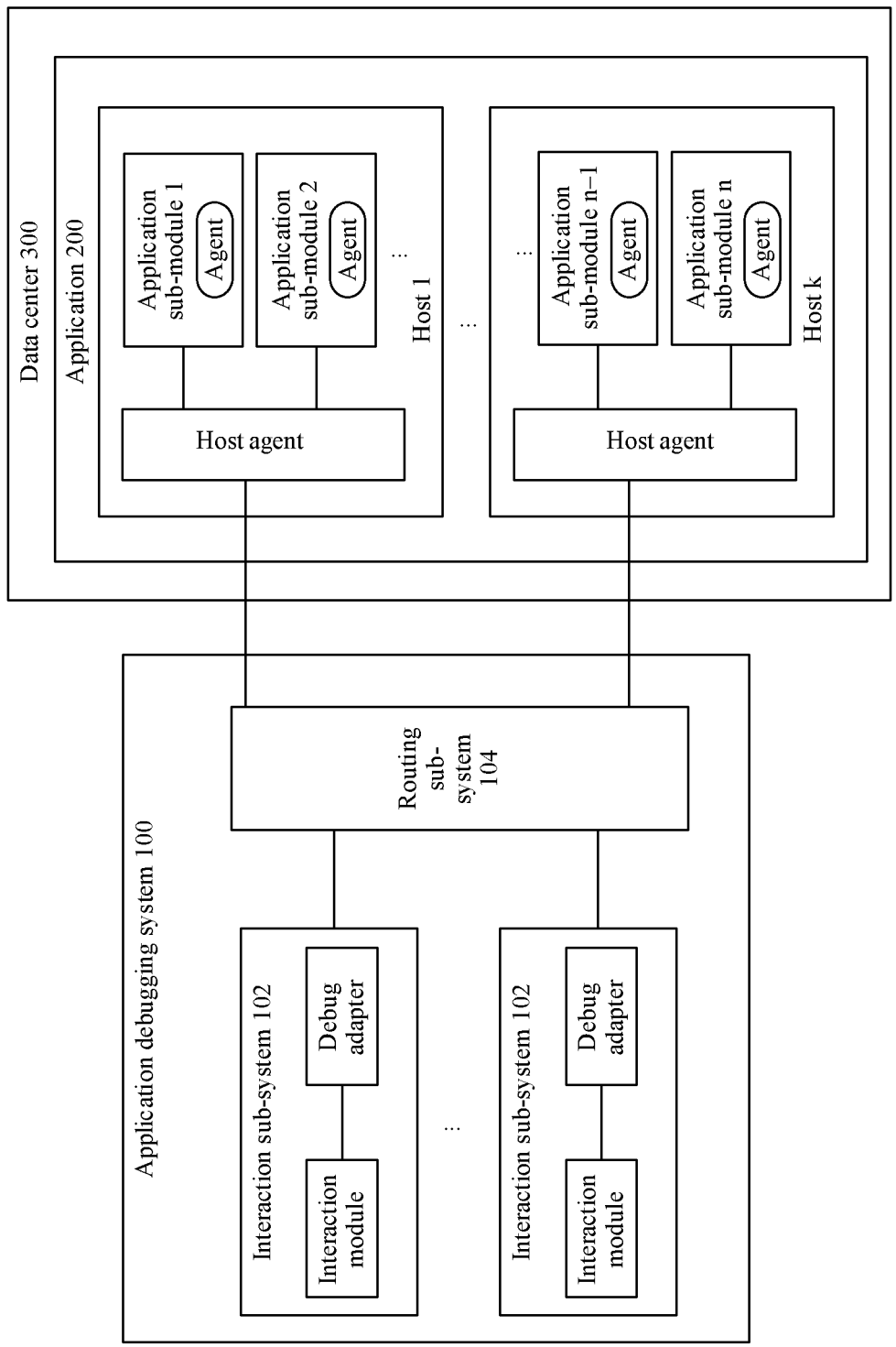
FIG. 1 is a diagram of an application scenario of an application debugging method according to an embodiment of this disclosure.

The terms "first" and "second" in the embodiments of this disclosure are merely intended for a purpose of description, and shall not be understood as an indication or implication of relative importance or implicit indication of a quantity of indicated technical features. Therefore, a feature limited to "first" and "second" may explicitly or implicitly include one or more of the features.

Some technical terms used in the embodiments of this disclosure are first described.

An application is a set of computer programs written for a special application purpose of a user, and may be application software formed by a single application program or a set of a plurality of application programs. For example, in the office field, the application may be a single text editing application, or may be an application including a text editing application, a table editing application, and a graphic editing application.

The application usually includes a plurality of application sub-modules. The application sub-module is a functional module that implements one or more functions by using a computer-executable code block. The application sub-module may be one or more source code files. The application sub-module can run in a production environment to provide services. The production environment is an environment in which a service is formally provided. The production environment includes at least one node, and the node is a computing node that has a computing capability, such as a server or a terminal computing device.

Developers can use a microservice architecture (MSA) to develop complex applications with various functions to improve development efficiency. The MSA means that a function module of the application is split into independent microservices. A microservice is a set of small and independent functional units. The microservices exchange data through interface calling. In this way, functional modules of the application can be decoupled. When a function needs to be added, deleted, or modified for an application, the developers only need to add, delete, or modify a corresponding microservice. The application sub-module may also be one or more microservices. The microservices run in the production environment to provide corresponding services.

It is considered that different programming languages (technology stacks) have their own advantages, and the developers can use different programming languages to develop application sub-modules of the application based on requirements during application development. For example, a developer may develop some application sub-modules of an application by using a C language, and develop other application sub-modules of the application by using a Python language.

When the developer debugs an application sub-module of an application by using a development tool such as an editor or an IDE, to debug the application sub-modules of the different programming languages, a separate extension or debugging module needs to be compiled for the development tool such as the editor, to invoke the corresponding debugger. In this way, development difficulty and development costs of the editor are increased, and the editor itself becomes relatively large. This has a relatively high requirement on hardware and affects user experience.

Based on this, a Debug Adapter Protocol (DAP) is proposed in the industry. Each editor may communicate with debuggers of different programming languages by using a same protocol, that is, the DAP, and there is no need to write extension or debugging modules for the editors for the different programming languages. This reduces development difficulty and development costs of the editors. In addition, a lightweight editor may be implemented, thereby improving availability and user experience of the editors.

It is considered that some debuggers do not support DAP, a debug adapter can be configured for the debuggers. Development tools such as the editor and IDE can communicate with the debug adapter corresponding to the debuggers to debug the application sub-modules of the corresponding programming languages. However, the DAP-based debugging method usually supports debugging of only one application sub-module of an application at the same time, and debugging efficiency is relatively low. How to efficiently debug applications has become a major concern in the industry.

In view of this, an embodiment of this disclosure provides an application debugging method. The method may be executed by an application debugging system. The application debugging system is configured to perform code debugging on an application sub-module of an application. The application debugging system includes a routing sub-system and at least one interaction sub-system. The application debugging system in this embodiment of this disclosure may support one or more users in performing code debugging on an application sub-module of an application by using respective interaction sub-systems.

For ease of description, in this embodiment of this disclosure, a process in which a user performs code debugging on the application by using one of at least one interaction sub-system is used as an example for description. The interaction sub-system receives identifiers of a plurality of application sub-modules that are input or selected by a user, where a code block included in each application sub-module is used to implement a function of an application. The interaction sub-system creates a plurality of debug sessions, where the plurality of debug sessions are in a one-to-one correspondence with a plurality of application sub-modules requested to be debugged. Then, the interaction sub-system generates a plurality of debugging request messages based on debug session identifiers corresponding to the plurality of debug sessions. The plurality of debugging request messages is routed by the routing sub-system to agents of the application sub-modules requested to be debugged, to request debugging of a code block of the corresponding application sub-module.

The debug session is a session used to debug the application sub-module. The debug sessions are in a one-to-one correspondence with the debugged application sub-modules. Each debug session has a unique debug session identifier. The debug session identifier is carried in the debugging request message, so that a connection may be established between the debugging request message and two ends of the debug session, such as the application sub-module and the interaction sub-system. In this way, each debugging request message and a debugging response message for the debugging request message may be transmitted at the two ends of the debug session, and are not transmitted to another application sub-module or interaction sub-system. In this way, the plurality of application sub-modules can be debugged at the same time, and debugging efficiency is improved.

An agent corresponding to each application sub-module is a code block deployed in the production environment together with the application. The code block is used to act as an agent for the application sub-module to interact with the outside and debug the application sub-module during running. The application sub-module (for example, the microservice) generates a process during running, and an agent of the application sub-module is essentially equivalent to an independent thread hosted in the process during running. The routing sub-system routes the debugging request messages generated when the user debugs different application sub-modules to the agents of the corresponding application sub-modules respectively, and the agents start debugging of the application sub-modules based on the debugging request messages. When the application debugging system debugs the application sub-modules of the application, the foregoing process is not blocked, and interaction is directly performed by using the thread hosted in the foregoing process. In this way, the application sub-module of the application can be directly debugged in the production environment. This improves the debugging efficiency.

To make the technical solutions of this disclosure clearer and easier to understand, the following describes, with reference to the accompanying drawings, an application scenario of an application debugging method provided in the embodiments of this disclosure.

As shown in FIG. 1, a communication path is established between an application debugging system 100 and a data center 300, and the application debugging system 100 is configured to debug at least one application 200 deployed in the data center 300. The data center 300 provides a production environment, and the application 200 is deployed in the production environment. The application 200 includes a plurality of application sub-modules, and a code block included in each application sub-module is used to implement a function of the application 200.

The application sub-modules of the application 200 may be deployed on at least one node of the data center 300 in a distributed manner. For example, in the example in FIG. 1, n application sub-modules of the application 200 are deployed on k nodes (also referred to as hosts) in the data center in a distributed manner, where k is less than or equal to n. It should be noted that the application sub-module may be directly deployed on a node, that is, deployed in a physical machine, or may be deployed in a virtual machine or a container on the node. When each application sub-module of the application 200 is deployed in an independent container, the application sub-modules running in containers may interact with each other through interfaces of the containers.

Each application sub-module has an agent (also called microservice agent when the application sub-module is a microservice). The agent can be created through code injection. Code injection is a technique for inserting standalone running code into a target process and making it run. Usually, code injection can be implemented by configuring environment variables. A Java platform is used as an example. An environment variable may be JAVA_TOOL_OPTIONS. An assigned value of the environment variable is a name of a code file to be inserted, for example, export JAVA_TOOL_OPTIONS="-agent-lib:hprof". When a process of the application sub-module (such as a microservice) is started, code in the inserted code file is written into virtual memory space of the foregoing process, and a thread corresponding to the inserted code is also started as the process is started. The thread can always run before the process served as a host is terminated.

The application debugging system 100 includes a routing sub-system 104 and at least one interaction sub-system 102. The following describes an application debugging process from a perspective of one interaction sub-system 102. The interaction sub-system 102 may receive identifiers of a plurality of application sub-modules that are input or selected by the user. The interaction sub-system 102 creates a plurality of debug sessions, where the plurality of debug sessions are in a one-to-one correspondence with the plurality of application sub-modules. Then, the interaction sub-system 102 generates a plurality of debugging request messages based on debug session identifiers corresponding to the plurality of debug sessions. Then, the interaction sub-system 102 sends the plurality of debugging request messages to the routing sub-system 104, and the routing sub-system 104 may respectively route the plurality of debugging request messages to the agents of the application sub-modules requested to be debugged. The agent may start code debugging of the corresponding application sub-module based on the debugging request message.

In some possible implementations, a node on which each application sub-module is located has a node agent. The node agent is also referred to as a host agent. The host agent is a code block deployed in the production environment together with the application 200. The host agent is configured to forward a message from the application sub-module on the node or forward a message to the application sub-module on the node. A process can be generated when the host agent is running. The program code corresponding to the process may be deployed to the node when the code block included in the application sub-module of the application 200 is deployed to the node. When the process of the application sub-module on the node is started, the host agent is started accordingly.

Based on this, when routing the debugging request messages, the routing sub-system 104 may first transmit the plurality of debugging request messages to the host agent of the node where the application sub-module requested to be debugged is located, and then the host agent transmits the plurality of debugging request messages to the agent corresponding to the application sub-module requested to be debugged.

In some possible implementations, the interaction sub-system 102 may include an interaction module and a debug adapter. The interaction module is configured to provide a user interface, for example, a graphical user interface (GUI) or a command user interface (CUI). The user can perform debugging operations in the foregoing user interfaces.

For example, the interaction module presents the application sub-module of the application 200 to the user through the GUI, and the user may perform a debugging selection and a debugging start operation through the GUI. The debugging selection includes selecting an application sub-module to be debugged. In some embodiments, the debugging selection may alternatively include a debugging type, such as breakpoint debugging, single step debugging, variable tracing, and the like. For another example, the user may also directly send a debugging selection and a debugging start operation in a form of a command through the CUI.

The interaction module may be an IDE that provides an application debugging function. The IDE can not only be used to edit program code of the application 200, debug program code in a development process, but also debug a remote online application 200. Alternatively, the interaction module may be another interaction module that can provide a function of debugging the online application 200, for example, an interaction module loaded with a browser for debugging a user interface of the application 200 or an interaction module dedicated to application debugging. For ease of description, an example in which the interaction module is an IDE is used below for description.

The debug adapter is actually a segment of program code. The program code may be provided to a user in a form of a plug-in, and the user may install the foregoing plug-in in the IDE. When the plug-in is executed, a service process independent of the IDE and a programming language framework is generated. The service process of the debug adapter functions as a middle layer between the IDE and a routing sub-system. It is used to listen to a debugging start operation from the IDE and establish a persistent connection to the routing sub-system, for example, a WebSocket connection. The persistent connection may be used to transmit a debugging message, for example, a debugging request message.

The application debugging system 100 shown in FIG. 1 has a plurality of deployment manners. The following describes in detail a deployment manner of the application debugging system 100.

In some implementations, sub-systems of the application debugging system 100 may be deployed in different environments in a distributed manner. For example, as shown in FIG. 2A, the interaction sub-system 102 may be deployed in a terminal computing device (for example, a user terminal such as a desktop computer or a notebook computer), and the routing sub-system 104 may be deployed in a cloud computing cluster (including at least one cloud computing device, for example, a cloud server).

Figure 2A:
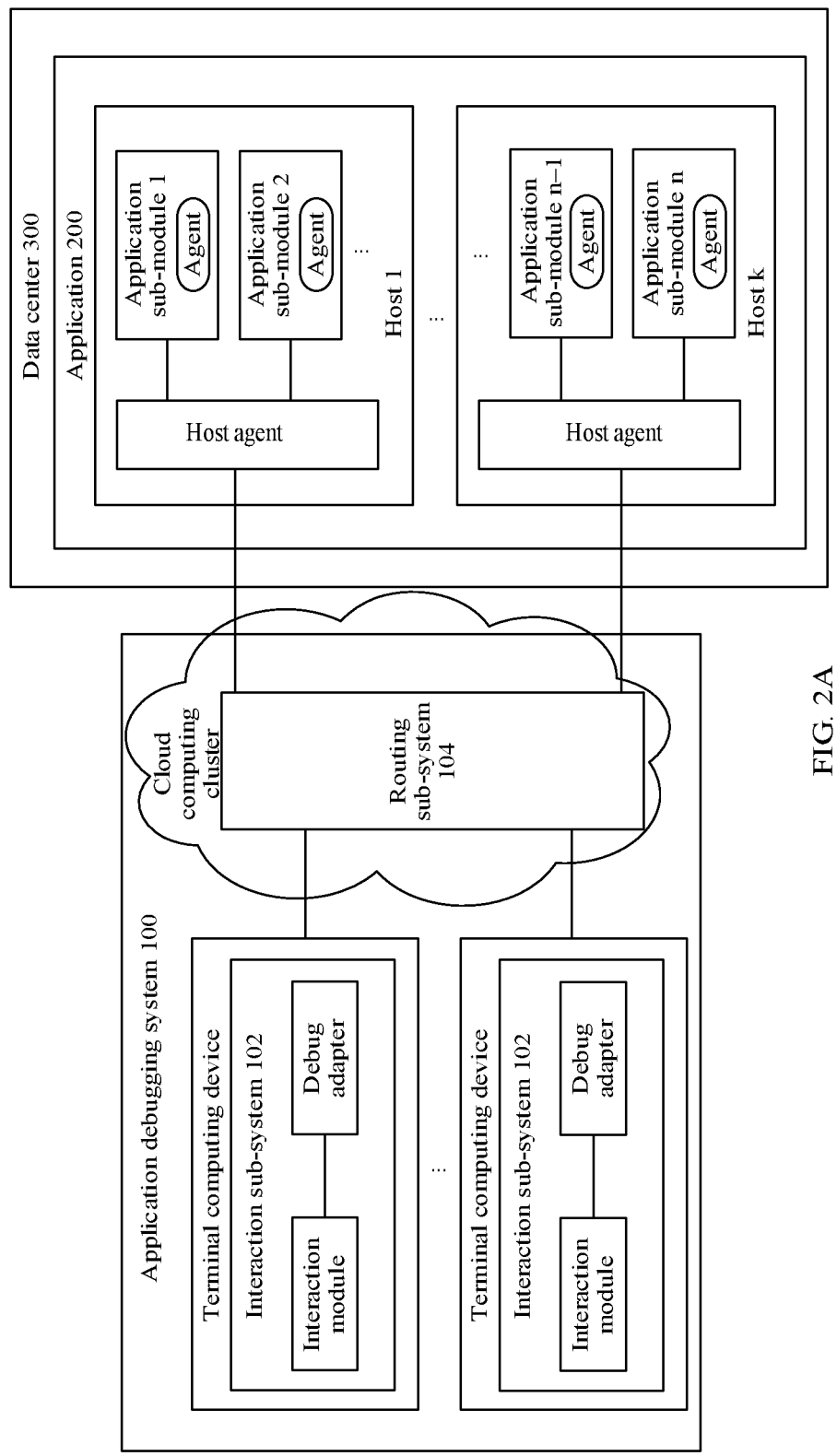
FIG. 2A is a system architectural diagram of an application debugging system according to an embodiment of this disclosure.

In the scenario in FIG. 2A, the interaction module may be a local IDE. The local environment is also referred to as a local device. The local device includes a terminal computing device (for example, a user terminal such as a desktop computer or a notebook computer) under direct control of the user. The local IDE is an IDE that is installed on the local device as a client. In some examples, the local IDE may include visual studio, eclipse, and the like. The debug adapter may be provided for a user in a form of a plug-in, and the user may install the plug-in in the local IDE, to debug the application 200. Installation packages of the IDE and debug adapter can be provided by the same vendor or different vendors.

Figure 2B:
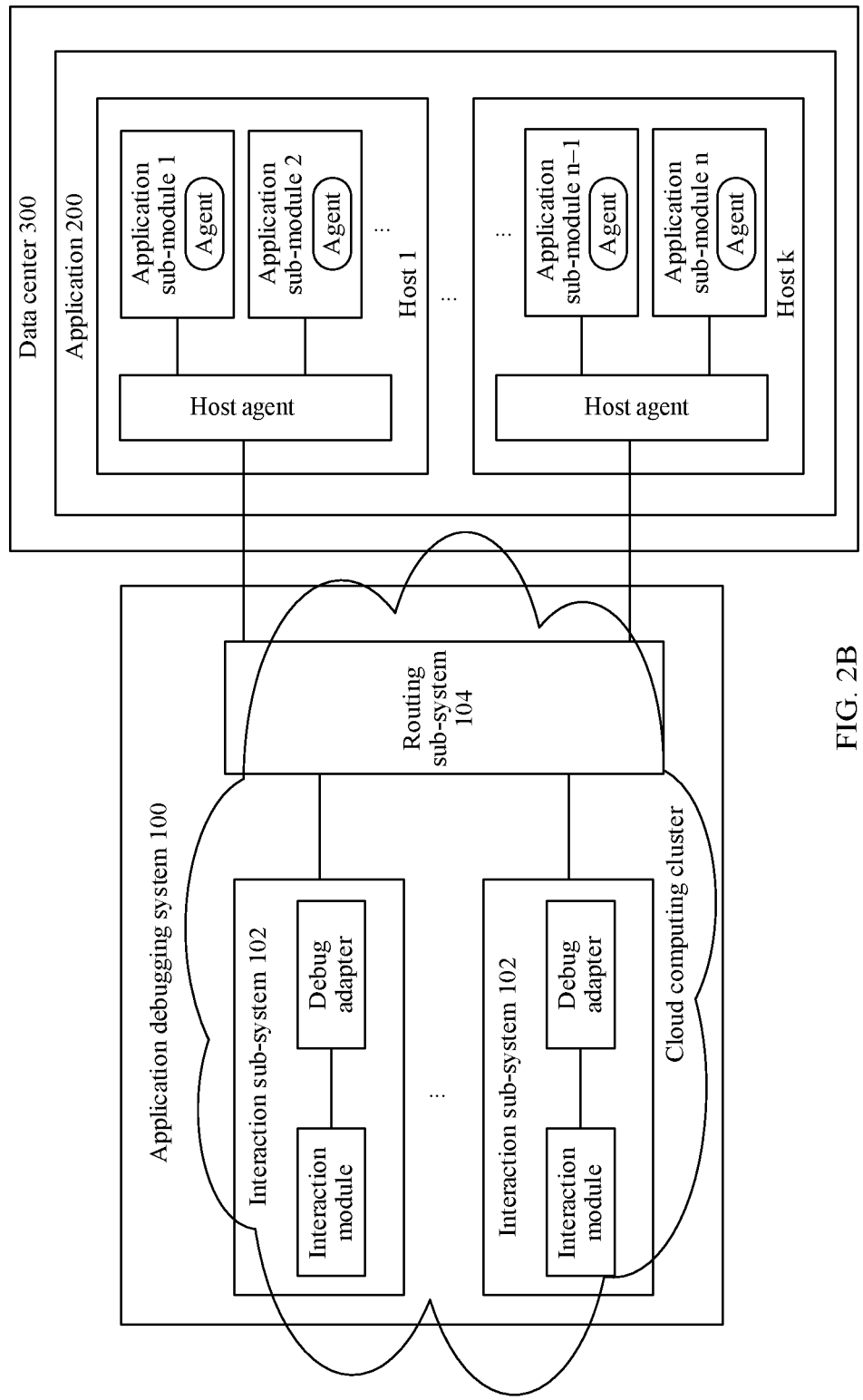
FIG. 2B is a system architectural diagram of an application debugging system according to an embodiment of this disclosure.

In some other implementations, the sub-systems of the application debugging system 100 may also be deployed in a same environment. For example, as shown in FIG. 2B, the interaction sub-system 102 and the routing sub-system 104 may be deployed in a same cloud computing cluster. The cloud computing cluster may be a public cloud provided by a cloud service provider. The interaction module may be a cloud IDE. The routing sub-system 104 may form a cloud debugger, configured to provide a cloud debugging service.

The cloud service provider can integrate the cloud debugger and the cloud IDE into one cloud service for users to use, or provide two cloud services of the cloud IDE and the cloud debugger for users to use. In some cases, the cloud service provider may use the cloud debugger as a value-added service of the cloud IDE. After a user purchases or leases the value-added service, the cloud service provider combines the value-added service in the cloud IDE and provides the cloud IDE for the user.

Figure 2C:
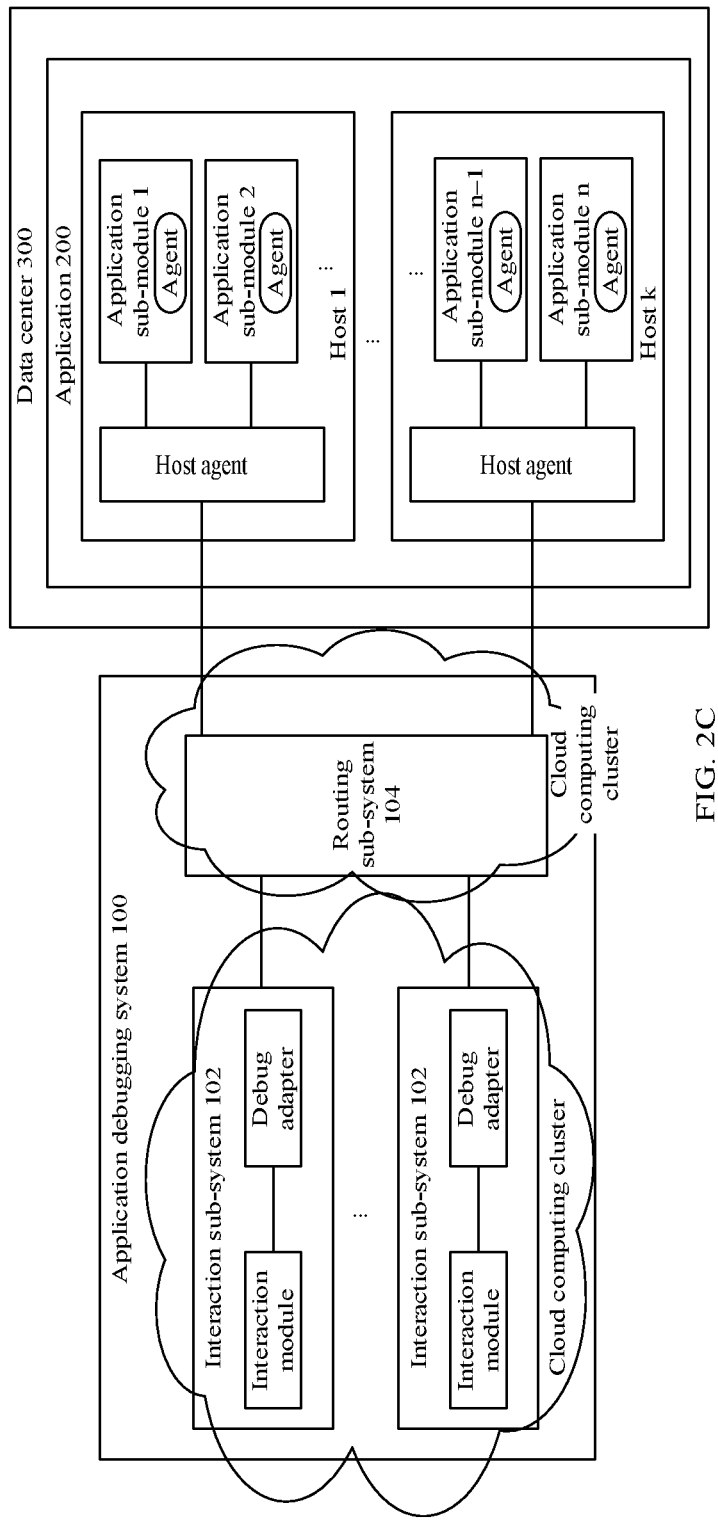
FIG. 2C is a system architectural diagram of an application debugging system according to an embodiment of this disclosure.

Certainly, as shown in FIG. 2C, the interaction sub-system 102 and the routing sub-system 104 may also be deployed in different cloud computing clusters. Different cloud computing clusters may be public clouds provided by different cloud service providers. Different cloud service providers provide the cloud IDE and the cloud debugger for users.

Further, the application 200 debugged by the application debugging system 100 may be deployed in a same or different cloud computing cluster as the interaction sub-system 102 and/or the routing sub-system 104, or may be independently deployed in any data center (for example, a data center owned by the user). FIG. 2A, FIG. 2B, and FIG. 2C show examples of a case in which the application 200 is deployed in the data center 300, and do not constitute a limitation on the technical solutions of this disclosure.

In addition, FIG. 2A, FIG. 2B, and FIG. 2C merely show some specific examples in which the application debugging system 100 is deployed in different environments or deployed in a same environment. In some implementations, the modules of the application debugging system 100 may be further deployed in another environment. For example, the interaction module and the debug adapter may be deployed in a terminal computing device or a cloud computing device, and the routing sub-system 104 may be deployed in an edge computing cluster (including at least one edge computing device, for example, an edge server).

To make the technical solutions of this disclosure clearer and easier to understand, the following describes in detail an application debugging method provided in the embodiments of this disclosure from a perspective of an interaction sub-system 102 with reference to the accompanying drawings.

Figure 3:
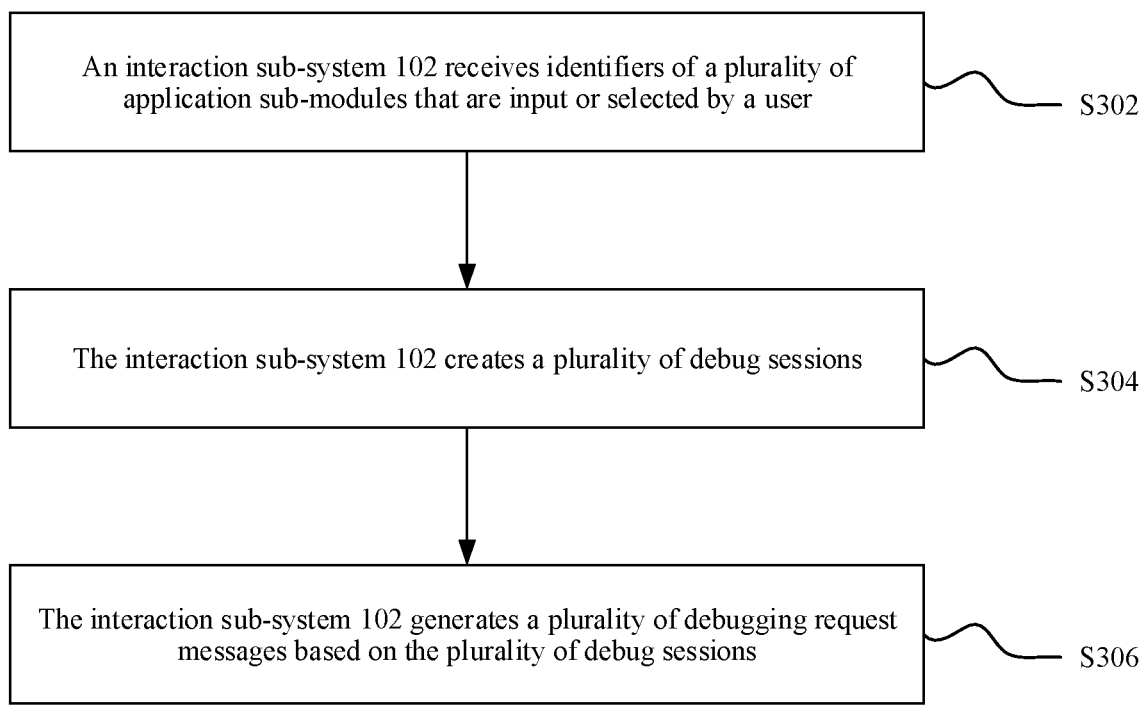
FIG. 3 is a flowchart of an application debugging method according to an embodiment of this disclosure.

Refer to a flowchart of an application debugging method shown in FIG. 3. The method includes the following steps.

S302: An interaction sub-system 102 receives identifiers of a plurality of application sub-modules that are input or selected by a user.

The interaction sub-system 102 (specifically, an interaction module) may present a list of application sub-modules of the application 200 and/or a topology diagram of the application sub-modules of the application 200 to the user through a user interface. The topology diagram of the application sub-modules is used to identify a calling relationship between the application sub-modules of the application 200. The user may select a plurality of application sub-modules through the foregoing user interface (for example, a GUI), and the interaction sub-system 102 receives identifiers of the plurality of application sub-modules that are selected by the user through the user interface (for example, the GUI).

In some possible implementations, the user may directly input the identifiers of the plurality of application sub-modules through the foregoing user interface (for example, the CUI), and the interaction module of the interaction sub-system 102 receives the identifiers of the plurality of application sub-modules that are input by the user through the user interface (for example, the CUI), to debug the plurality of application sub-modules.

Each application sub-module has a unique identifier. Different application sub-modules have different identifiers. In some embodiments, the identifier of the application sub-module may be a name, a number, or the like of the application sub-module. For example, the application sub-module is a microservice, and the identifier of the application sub-module may be a microservice name.

S304: The interaction sub-system 102 creates a plurality of debug sessions.

A debug adapter in the interaction sub-system 102 may listen to a debugging start operation. When the debug adapter listens to the debugging start operation on the plurality of application sub-modules, a plurality of debug sessions that are in a one-to-one correspondence with the application sub-modules can be created.

When the user selects or inputs identifiers of the plurality of application sub-modules through the interaction module of the interaction sub-system 102 and starts debugging of the plurality of application sub-modules, the interaction module may generate a plurality of original debugging request messages. The original debugging request message is a request message that is generated by the interaction module according to a native DAP and that is used to debug the application sub-module. Each original debugging request message is used to request debugging of one of the plurality of application sub-modules. Different original debugging request messages request different application sub-modules for debugging.

The debug adapter listens to the plurality of original debugging request messages and can create a plurality of debug sessions. The plurality of debug sessions are in a one-to-one correspondence with the plurality of application sub-modules that are requested to be debugged by the plurality of original debugging request messages. When creating the debug session, the debug adapter in the interaction sub-system 102 may further first detect whether a debug session corresponding to the application sub-module requested to be debugged by the original debugging request message exists. If the debug session corresponding to the application sub-module requested to be debugged by the original debugging request message does not exist, the debug adapter creates the corresponding debug session. If the debug session corresponding to the application submodule requested to be debugged by the original debugging request message exists, the debug adapter skips the step of creating the debug session.

In some possible implementations, the debug adapter in the interaction sub-system 102 may further maintain a debug request queue, and the debug request queue is dedicated to storing an original debug request message sent by the interaction module such as the IDE. The debug adapter may sequentially read the original debugging request message from the debugging request queue, to perform a step of creating a corresponding debug session.

The debug session is a session used to debug an application sub-module. The debug sessions are in a one-to-one correspondence with the debugged application sub-modules. Each debug session has a unique debug session identifier. The debug session identifier is carried in the debugging request message, so that a connection may be established between the debugging request message and two ends of the debug session, such as the application sub-module and the interaction sub-system. In this way, each debugging request message and a debugging response message for the debugging request message may be transmitted at the two ends of the debug session, and are not transmitted to another application sub-module or interaction sub-system.

Each debug session has a unique identifier, and the identifier is referred to as a debug session identifier. The two ends of each debug session correspond to an interaction sub-system (specifically, an interaction module, such as an IDE) and an application sub-module (specifically, an agent of the application sub-module). Therefore, the debug adapter may generate a debug session identifier based on an identifier of the interaction sub-system (for example, an identifier of a user using the interaction sub-system, that is, a user identifier) and an identifier of the application sub-module (for example, an identifier of a resource to which the application sub-module belongs, that is, a resource identifier).

In some examples, the debug adapter may combine the user identifier of the interaction sub-system and the resource identifier of the resource to which the application sub-module belongs to generate the debug session identifier. Further, the debug adapter may further combine the user identifier of the interaction sub-system, the resource identifier of the resource to which the application sub-module belongs, and a reserved field to generate the debug session identifier. The reserved field may be a fixed value, or may be a random number generated in a random manner.

In some possible implementations, the debug adapter may also sort a plurality of debug sessions, and use a sequence number as the debug session identifier, or the debug adapter may generate a random number as the debug session identifier. When the debug adapter uses the sequence number or the random number as the debug session identifier, the debug adapter may further associate the debug session identifier with a user identifier of a corresponding interaction sub-system and a resource identifier of a resource to which an application sub-module belongs. For example, the debug adapter may store the debug session identifier, the user identifier of the corresponding interaction sub-system, and the resource identifier of the resource to which the application sub-module belongs in a debug session object.

S306: The interaction sub-system 102 generates a plurality of debugging request messages based on the plurality of debug sessions.

The interaction sub-system 102 (specifically, the interaction module in the interaction sub-system 102) may generate a plurality of original debugging request messages based on the identifiers of the plurality of application sub-module, and then the interaction module may send the plurality of original debugging request messages to the debug adapter. The interaction sub-system 102 (specifically, the debug adapter in the interaction sub-system 102) may add debug session identifiers corresponding to the application sub-modules requested to be debugged to the plurality of original debugging request messages, and obtain the plurality of debugging request messages.

The interaction sub-system 102 (specifically, the debug adapter in the interaction sub-system 102) may send a plurality of debugging request messages to the routing sub-system. The routing sub-system may respectively route the plurality of debugging request messages to the agents of the application sub-modules requested to be debugged. The agent of the application sub-module receives the debugging request message, and starts code debugging of the application sub-module, for example, performs breakpoint debugging, single step execution, and variable tracing on a code block of the application sub-module. The agent of the application sub-module may further generate a debugging response message. The debugging response message may carry a debug session identifier, so that the routing sub-system may route the debugging response message to the corresponding interaction sub-system based on the debug session identifier.

In some possible implementations, the interaction sub-system 102 (specifically, the debug adapter in the interaction sub-system 102) may further create a global debug session for one debugging start operation. Two ends of the global debug session are the interaction sub-system 102 and the debugged application 200 (for example, the plurality of application sub-modules of the application 200). A difference between a debug session corresponding to the global debug session and a debug session corresponding to the application sub-module lies in that one global debug session corresponds to a plurality of application sub-modules that are requested to be debugged for one debugging start operation, but one debug session corresponds to one application sub-module that is requested to be debugged. Therefore, one global debug session usually corresponds to the plurality of debug sessions. The global debug session may be used to manage debugging messages of the plurality of application sub-modules that are requested to be debugged for one debugging start operation, for example, filter and aggregate the plurality of debugging response messages.

The global debug session has a unique identifier, and the identifier is referred to as a global debug session identifier. Based on this, the interaction sub-system 102 (specifically, the debug adapter in the interaction sub-system 102) may add, to the plurality of original debugging request messages, a global debug session identifier and debug session identifiers that correspond to the application sub-modules requested to be debugged, to generate a plurality of debugging request messages.

Because the plurality of debugging request messages further carry the global debug session identifier, the agent of the application sub-module may also carry the global debug session identifier in the debugging response message. In this way, when receiving the debugging response message, the interaction sub-system 102 may further filter and aggregate a plurality of debugging response messages based on the global debug session identifier, and specifically, filter and aggregate debugging response messages corresponding to different debugging start operations. The interaction sub-system 102 may generate a topology diagram and/or a debugging request response flow diagram of the application sub-modules based on a result obtained after filtering and aggregation, and present the topology diagram and/or the request response flow diagram to the user.

It is considered that the native DAP does not support a resource identifier or a plurality of debug sessions. Therefore, the original debugging request message does not carry a resource identifier or a debug session identifier. The debug adapter may add metadata including a resource identifier and a debug session identifier to an original debug request message (which may also be referred to as a DAP message), to generate the debug request message. The debug adapter may add the foregoing metadata to a message header of the original debugging request message to obtain the debugging request message.

In some possible implementations, the metadata may further include a global session identifier, namely, a global session identifier. In this way, the interaction sub-system may further filter and aggregate, based on the global session identifier, the debugging response message returned by the agent of the application sub-module, to generate a request response flow diagram, and display the request response flow diagram in the interaction sub-system.

Due to transmission overheads, the interaction sub-system 102 (specifically, the debug adapter in the interaction sub-system 102) may further delete standard message headers of the original debugging request messages, and add updated message headers to the plurality of original debugging request messages, the updated message headers include the debug session identifiers corresponding to the application sub-modules requested to be debugged, so as to obtain the debugging request message. The updated message header may further include at least one of a global session identifier and a resource identifier.

Further, when receiving a plurality of debugging response messages, the interaction sub-system 102 (specifically, the debug adapter in the interaction sub-system 102) may further delete message headers of the plurality of debugging response messages, where the message headers include the debug session identifier, and add standard message headers, for example, DAP message headers, to the plurality of debugging response messages, and obtain processed debugging response messages. Then, the debug adapter returns the processed debugging response message to the interaction module such as the IDE.

For ease of understanding, this disclosure further provides an example of processing an original debugging request message to obtain a debugging request message, and processing a debugging response message to obtain a processed debugging response message for description.

Figure 4:
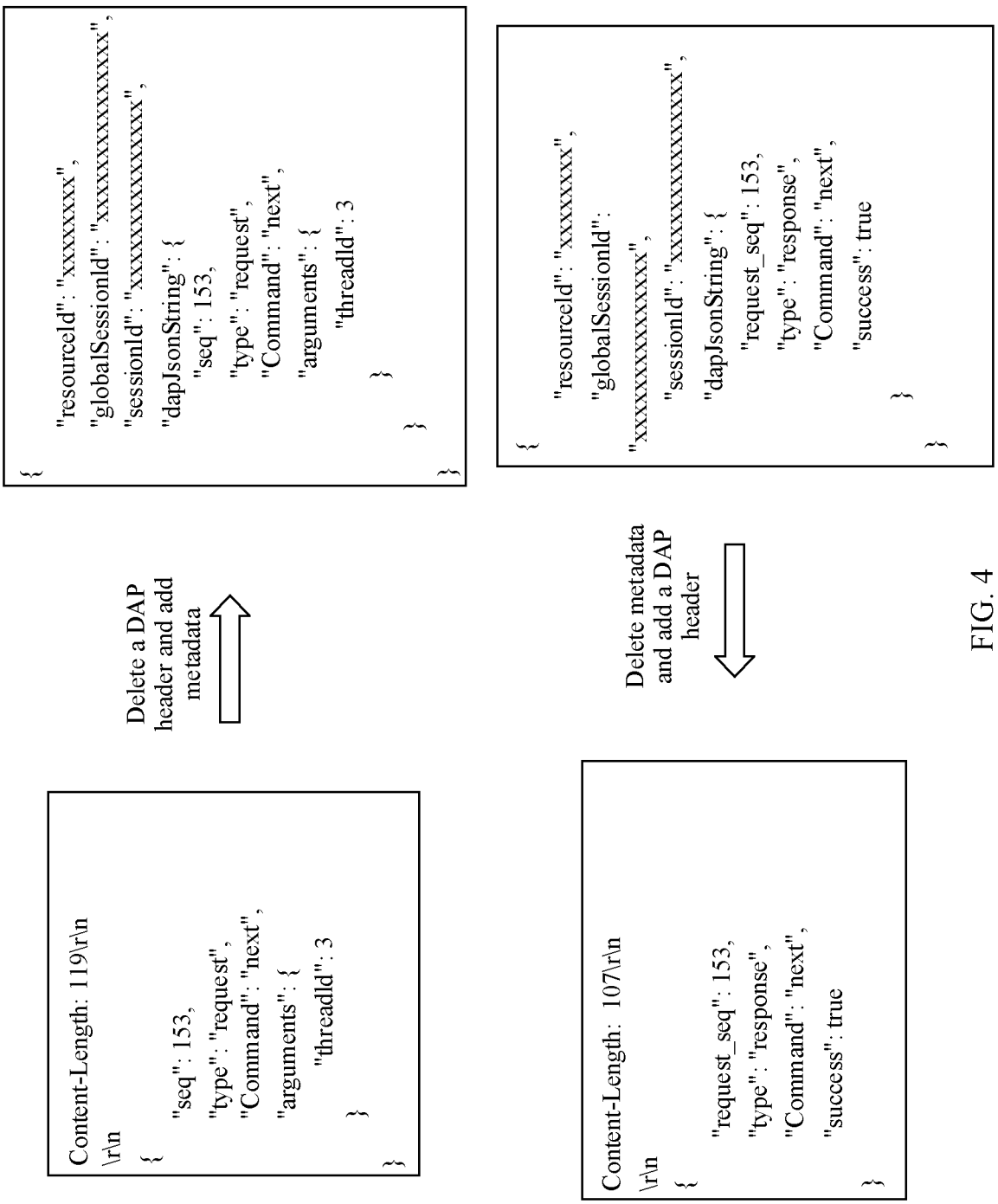
FIG. 4 is a schematic diagram of message processing according to an embodiment of this disclosure.

Refer to FIG. 4. After receiving an original debugging request message from the IDE, the debug adapter may delete a DAP header of the original debugging request message, and then add metadata according to the following format to form a debugging request message:

```
struct TDapWrapper {
    1: string resource ID
    2: string global session ID
    3: string session ID
    4: string dapJsonString
}
```

"resource ID" indicates a resource identifier, "global session ID" indicates a global debug session identifier, "session ID" indicates a debug session identifier, and "dapJsonString" indicates message content.

As shown in FIG. 4, when receiving the original debugging request message from the IDE, the debug adapter deletes the DAP header of the original debugging request message. In this example, the DAP header of the original debugging request message is:

Content-Length: 107\r\n\r\n.

Then, the debug adapter adds metadata to the original debugging request message. The debug adapter may add an updated message header to the original debugging request message, where the updated message header carries metadata such as a resource identifier, a global session identifier, and a session identifier, so as to obtain the debugging request message.

When receiving the debugging response message from the agent of the application sub-module, the debug adapter may delete the metadata in the debugging response message, specifically, delete the resource identifier, the global session identifier, and the session identifier, retain content in the dapJsonString, then add, to the content, a DAP message header, that is, Content-Length: 107\r\n\r\n, and obtain processed debugging response message. The debug adapter returns the processed debugging response message to the IDE.

Based on the foregoing content description, an embodiment of this disclosure provides an application debugging method. The interaction sub-system 102 receives identifiers of a plurality of application sub-modules that are input or selected by the user. The interaction sub-system 102 creates a plurality of debug sessions, where the plurality of debug sessions are in a one-to-one correspondence with the plurality of application sub-modules requested to be debugged. Then, the interaction sub-system 102 generates a plurality of debugging request messages based on debug session identifiers corresponding to the plurality of debug sessions. The plurality of debugging request messages are routed by the routing sub-system 104 to an agent of the application sub-module requested to be debugged, to request debugging of a code block of the corresponding application sub-module.

The debugging request message carries a debug session identifier, so that a connection may be established between the debugging request message and two ends of the debug session, such as an application sub-module and an interaction sub-system. In this way, each debugging request message and a debugging response message for the debugging request message may be transmitted at the two ends of the debug session, and are not transmitted to another application sub-module or interaction sub-system. In this way, the plurality of application sub-modules can be debugged at the same time, and debugging efficiency is improved.

In the embodiment shown in FIG. 3, the interaction sub-system 102 (specifically, the debug adapter in the interaction sub-system 102) may establish a persistent connection to the routing sub-system 104 before transmitting a plurality of debugging request messages. Further, to avoid a waste of resources, the debug adapter may disconnect the persistent connection between the debug adapter and the routing sub-system when there is no debug session, for example, when the plurality of debug sessions is closed. When the debug adapter listens to a new debugging start operation and receives a new original debugging request message, the debug adapter establishes a persistent connection to the routing sub-system 104.

In some possible implementations, the debug adapter may add the received original debugging request message to a debugging request queue when establishing a connection. When the persistent connection between the debug adapter and the routing sub-system 104 is successfully established, the debug adapter creates a corresponding debug session for each original debugging request message in the debugging request queue. When the persistent connection between the debug adapter and the debug agent fails to be established, the debug adapter can discard all the original debugging request messages that are queued. Further, the debug adapter may further return a prompt message to the interaction module such as the IDE, to prompt that the connection fails to be established. In this way, the interaction module can re-establish a persistent connection to the debug adapter.

The foregoing describes in detail the application debugging methods provided in the embodiments of this disclosure with reference to FIG. 1 to FIG. 4. The following describes an apparatus and a device provided in the embodiments of this disclosure with reference to the accompanying drawings.

Figure 5:
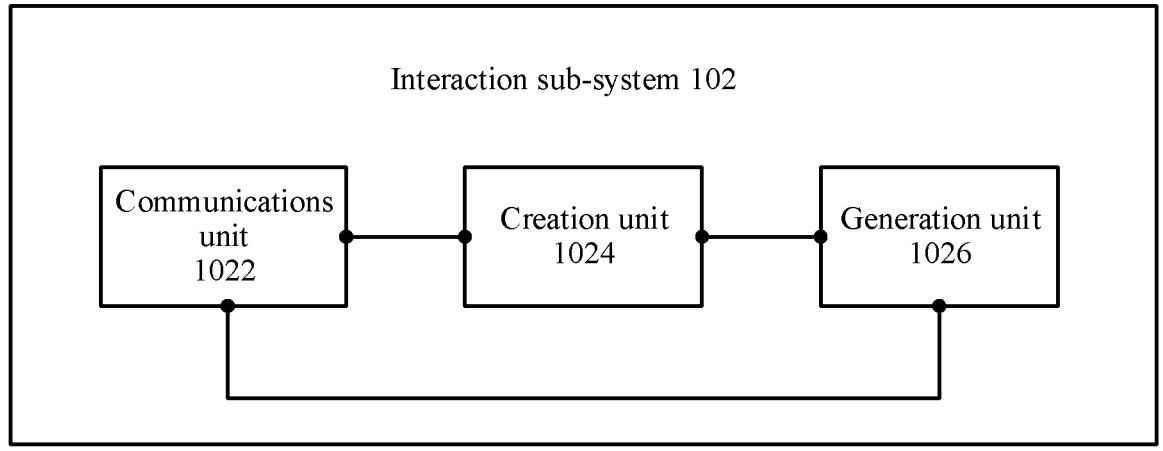
FIG. 5 is a schematic diagram of a structure of an interaction sub-system according to an embodiment of this disclosure.

Refer to a schematic diagram of a structure of the interaction sub-system 102 shown in FIG. 5. The interaction sub-system 102 includes: a communications unit 1022, configured to receive identifiers of a plurality of application sub-modules that are input or selected by a user, where a code block included in each application sub-module is used to implement a function of the application; a creation unit 1024, configured to create a plurality of debug sessions, where the plurality of debug sessions are in a one-to-one correspondence with the plurality of application sub-modules; and a generation unit 1026, configured to generate a plurality of debugging request messages based on the plurality of debug sessions, where each debugging request message is routed by the routing sub-system to an agent of an application sub-module requested to be debugged, to request debugging of a code block of the corresponding application sub-module.

The communications unit 1022, the creation unit 1024, and the generation unit 1026 may be software units, and these software units may be deployed in a terminal device or a cloud device. Certainly, the foregoing unit may also be a hardware unit. This is not limited in this embodiment of this disclosure.

In some possible implementations, each debug session includes a debug session identifier, and the generation unit 1026 is configured to: generate a plurality of original debugging request messages based on the identifiers of the plurality of application sub-modules; and add, to the plurality of original debugging request messages, debug session identifiers corresponding to application sub-modules requested to be debugged, to obtain the plurality of debugging request messages.

In some possible implementations, the creation unit 1024 is further configured to: create a global debug session, where the global debug session corresponds to the plurality of debug sessions.

The generation unit 1026 is configured to: add, to the plurality of original debugging request messages, a global debug session identifier and the debug session identifiers that correspond to the application sub-modules requested to be debugged, to generate the plurality of debugging request messages.

In some possible implementations, the communications unit 1022 is further configured to: receive a plurality of debugging response messages, where the plurality of debugging response messages are in a one-to-one correspondence with the plurality of debugging request messages.

In some possible implementations, the sub-system 102 further includes: a processing unit, configured to establish a persistent connection to the routing sub-system before the plurality of debugging request messages are sent to the routing sub-system.

In some possible implementations, the processing unit is further configured to: discard, by the interaction sub-system, a received debugging request message when the persistent connection fails to be established.

In some possible implementations, the sub-system further includes: a processing unit, configured to disconnect the persistent connection to the routing sub-system when the plurality of debug sessions are closed.

The interaction sub-system 102 according to this embodiment of this disclosure may correspondingly perform the methods described in the embodiments of this disclosure, and the foregoing and other operations and/or functions of the modules/units of the interaction sub-system 102 are separately used to implement corresponding procedures of the methods in the embodiment shown in FIG. 3. For brevity, details are not described herein again.

This disclosure further provides an apparatus for processing a debugging request message. The apparatus may be the debug adapter shown in FIG. 1. The following describes a structure of the apparatus in detail with reference to the accompanying drawings.

Figure 6:
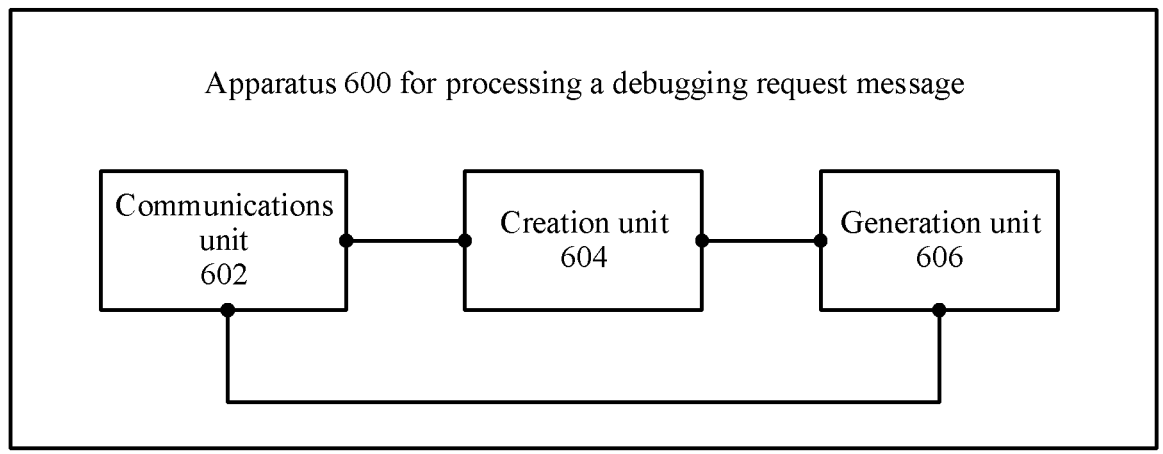
FIG. 6 is a schematic diagram of a structure of an apparatus for processing a debugging request message according to an embodiment of this disclosure.

Refer to a schematic diagram of a structure of an apparatus for processing a debugging request message shown in FIG. 6. The apparatus 600 includes: a communications unit 602, configured to receive a plurality of original debugging request messages, where each original debugging request message is used to request to debug one application sub-module of an application, and a code block included in each application sub-module is used to implement a function of the application; a creation unit 604, configured to create a plurality of debug sessions, where the plurality of debug sessions are in a one-to-one correspondence with a plurality of application sub-modules requested to be debugged; a generation unit 606, configured to generate a plurality of debugging request messages based on debug session identifiers corresponding to the plurality of debug sessions and the plurality of original debugging request messages; and the communications unit 602, further configured to send the plurality of debugging request messages.

In some possible implementations, the generation unit 606 is configured to: add, to the plurality of original debugging request messages, the debug session identifiers corresponding to the application sub-modules requested to be debugged, to obtain the plurality of debugging request messages.

In some possible implementations, the creation unit 604 is further configured to: create a global debug session, where the global debug session corresponds to the plurality of debug sessions.

The generation unit 606 is configured to: add, to the plurality of original debugging request messages, a global debug session identifier and the debug session identifiers that correspond to the application sub-modules requested to be debugged, to obtain the plurality of debugging request messages.

In some possible implementations, the generation unit 606 is configured to: delete standard message headers of the plurality of original debugging request messages; and add updated message headers to the plurality of original debugging request messages, where the updated message headers include the debug session identifiers corresponding to the application sub-modules requested to be debugged.

In some possible implementations, the communications unit 602 is further configured to: receive a plurality of debugging response messages, where the plurality of debugging response messages are in a one-to-one correspondence with the plurality of debugging request messages.

In some possible implementations, the generation unit 606 is configured to: delete message headers of the plurality of debugging response messages, where the message headers of the debugging response messages include the debug session identifiers; and add standard message headers to the plurality of debugging response messages.

In some possible implementations, the apparatus 600 further includes: a processing unit, configured to establish a persistent connection to a routing sub-system, where the routing sub-system is configured to route the debugging request message to an agent of the application sub-module requested to be debugged.

In some possible implementations, the processing unit is further configured to: discard a received debugging request message when the persistent connection fails to be established.

In some possible implementations, the apparatus 600 further includes: a processing unit, configured to disconnect the persistent connection to the routing sub-system when the plurality of debug sessions are closed.

The apparatus 600 for processing the debugging request message according to this embodiment of this disclosure may correspondingly perform the method described in the embodiments of this disclosure, and the foregoing and other operations and/or functions of the modules/units of the apparatus 600 for processing the debugging request message are separately used to implement corresponding procedures of the methods in the embodiment shown in FIG. 3. For brevity, details are not described herein again.

An embodiment of this disclosure further provides a computing device 700. The computing device 700 may be a terminal computing device such as a notebook computer or a desktop computer, or may be a cloud computing device in a cloud environment, or may be an edge computing device in an edge environment. Certainly, the computing device 700 may alternatively be a computing cluster formed by a plurality of devices. The computing device 700 is configured to implement a function of the interaction sub-system 102 shown in FIG. 5 or the apparatus 600 for processing the debugging request message shown in FIG. 6.

Figure 7:
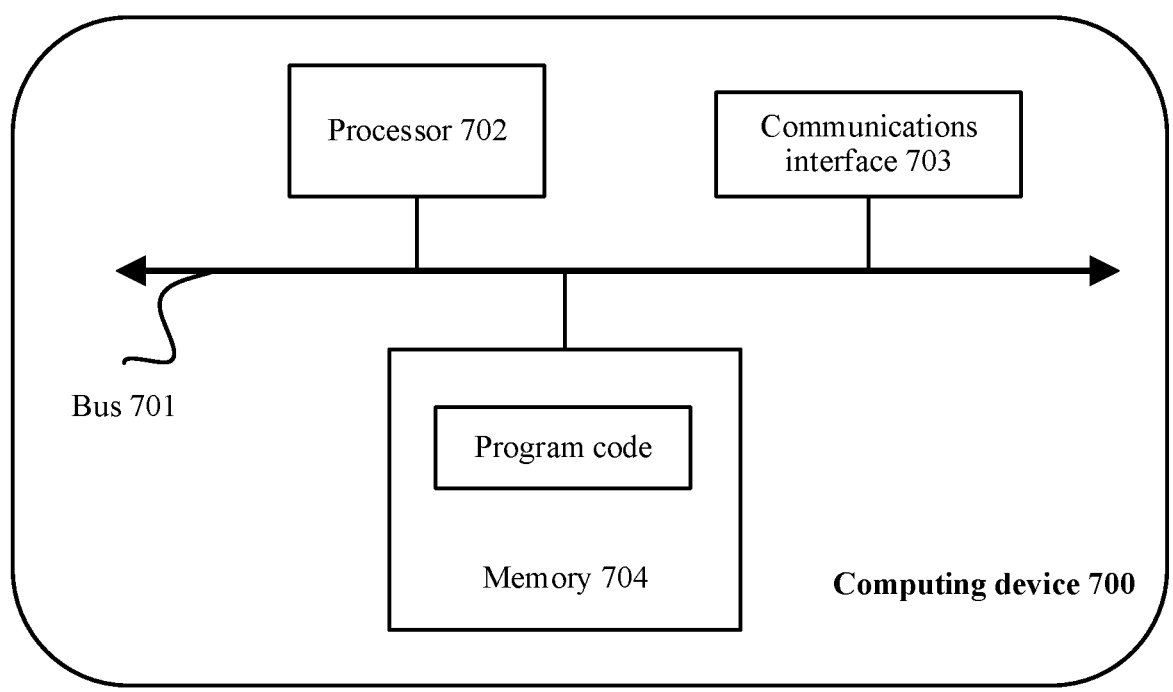
FIG. 7 is a schematic diagram of a structure of a device according to an embodiment of this disclosure.

FIG. 7 provides a schematic diagram of a structure of a computing device 700. As shown in FIG. 7, the computing device 700 includes a bus 701, a processor 702, a communications interface 703, and a memory 704. The processor 702, the memory 704, and the communications interface 703 communicate with each other through the bus 701.

The bus 701 may be a Peripheral Component Interconnect (PCI) bus, an Extended Industry Standard Architecture (EISA) bus, or the like. The bus may be classified into an address bus, a data bus, a control bus, and the like. For ease of representation, only one bold line is used for representation in FIG. 7, but this does not mean that there is only one bus or only one type of bus.

The processor 702 may be any one or more of processors such as a central processing unit (CPU), a graphics processing unit (GPU), a microprocessor (MP), or a digital signal processor (DSP).

The communications interface 703 is configured to communicate with the outside. For example, when the functions of the interaction sub-system 102 shown in FIG. 5 are implemented, the communications interface 703 is configured to receive the identifiers of the plurality of application sub-modules that are input or selected by the user, and send the plurality of debugging request messages to the routing sub-system 104. For another example, when the functions of the apparatus 600 for processing the debugging request message shown in FIG. 6 are implemented, the communications interface 703 is configured to receive a plurality of original debugging request messages, send a plurality of debugging request messages, and the like.

The memory 704 may include a volatile memory, for example, a random-access memory (RAM). The memory 704 may further include a non-volatile memory, for example, a read-only memory (ROM), a flash memory, a hard disk drive (HDD), or a solid-state drive (SSD).

The memory 704 stores executable code, and the processor 702 executes the executable code to perform the method in the foregoing embodiment.

When the embodiment shown in FIG. 5 is implemented, and the units of the interaction sub-system 102 described in the embodiment in FIG. 5 are implemented by using software, software or program code used for performing functions of the creation unit 1024 and the generation unit 1026 in FIG. 5 is stored in the memory 704. A function of the communications unit 1022 is implemented by using the communications interface 703.

The communications interface 703 receives the identifiers of the plurality of application sub-modules that are input or selected by the user, and transmits the identifiers of the plurality of application sub-modules that are input or selected by the user to the processor 702 through the bus 701. The processor 702 executes the program code in the memory 704, to create a plurality of debug sessions, and generate a plurality of debugging request messages based on the plurality of debug sessions.

When the embodiment shown in FIG. 6 is implemented, and the units of the apparatus 600 for processing a debugging request message described in the embodiment shown in FIG. 6 are implemented by using software, software or program code used for performing functions of the creation unit 604 and the generation unit 606 in FIG. 6 is stored in the memory 704. A function of the communications unit 602 is implemented by using the communications interface 703.

The communications interface 703 receives a plurality of original debugging request messages, and transmits the plurality of original debugging request messages to the processor 702 by using the bus 701. The processor 702 executes the program code in the memory 704, to create a plurality of debug sessions, and generate a plurality of debugging request messages based on debug session identifiers corresponding to the plurality of debug sessions and the plurality of original debugging request messages. Then, the communications interface 703 sends the plurality of debugging request messages.

An embodiment of this disclosure further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD)), a semiconductor medium (for example, a solid-state disk), or the like. The computer-readable storage medium includes instructions, and the instructions instruct a computing device to perform the foregoing application debugging method or the method for processing the debugging request message.

An embodiment of this disclosure further provides a computer program product. The computer program product includes one or more computer instructions. When the computer instructions are loaded and executed on a computer device, the procedure or functions according to the embodiments of this disclosure are all or partially generated.

The computer instructions may be stored in a computer-readable storage medium or may be transmitted from a computer-readable storage medium to another computer-readable storage medium. For example, the computer instructions may be transmitted from a website, computer, or data center to another website, computer, or data center in a wired (for example, a coaxial cable, an optical fiber, or a digital subscriber line (DSL)) or wireless (for example, infrared, radio, or microwave) manner.

The computer program product may be a software installation package. When any method of the foregoing application debugging method or the method for processing the debugging request message needs to be used, the computer program product may be downloaded and executed on a computing device.

Descriptions of procedures or structures corresponding to the foregoing accompanying drawings have respective focuses. For a part that is not described in detail in a procedure or structure, refer to related descriptions of other procedures or structures.

What is claimed is:

1. A method, comprising:
receiving, by an interaction sub-system of an application debugging system, identifiers of a plurality of application sub-modules from a user, wherein a code block comprised in each of the application sub-modules is for implementing a function of an application;
creating, by the interaction sub-system, a plurality of debug sessions, wherein the debug sessions are in a one-to-one correspondence with the application sub-modules;
generating, by the interaction sub-system and based on the plurality of debug sessions, a plurality of debugging request messages by:
deleting standard message headers of a plurality of original debugging request messages; and
adding updated message headers to the plurality of original debugging request messages, wherein the updated message headers comprise a global debug session identifier and debug session identifiers; and
routing, by a routing sub-system of the application debugging system, the debugging request messages to agents of the application sub-modules to request debugging of code blocks.

2. The method of claim 1, wherein each debug session comprises one of the debug session identifiers, and wherein generating, by the interaction sub-system and based on the plurality of debug sessions, the plurality of debugging request messages further comprises generating, by the interaction sub-system and based on the identifiers, the plurality of original debugging request messages.

3. The method of claim 2, further comprising creating, by the interaction sub-system, a global debug session, wherein the global debug session comprises the global debug session identifier and corresponds to the plurality of debug sessions, and wherein adding the updated message headers comprises adding, by the interaction sub-system, the global debug session identifier to the plurality of original debugging request messages to obtain the plurality of debugging request messages.

4. The method of claim 1, further comprising receiving, by the interaction sub-system, a plurality of debugging response messages, wherein the debugging response messages are in a one-to-one correspondence with debugging request messages.

5. The method of claim 1, wherein before routing, by the routing sub-system of the application debugging system, each debugging request message to the agent of one of the application sub-modules, the application debugging method further comprises establishing, by the interaction sub-system, a persistent connection to the routing sub-system.

6. The method of claim 1, further comprising discarding, by the interaction sub-system, a received debugging request message when a persistent connection to the routing sub-system fails to be established.

7. The method of claim 1, further comprising disconnecting, by the interaction sub-system, a persistent connection to the routing sub-system when the plurality of debug sessions is closed.

8. The method of claim 1, wherein deleting the standard message headers comprises deleting debug adapter protocol (DAP) headers of the original debugging request messages.

9. A method, comprising:
receiving a plurality of original debugging request messages, wherein each original debugging request message is for requesting to debug one of a plurality of application sub-modules of an application, and wherein a code block comprised in each application sub-module is for implementing a function of the application;
creating a plurality of debug sessions, wherein the debug sessions are in a one-to-one correspondence with the application sub-modules;
generating, based on debug session identifiers corresponding to the plurality of debug sessions and the plurality of original debugging request messages, a plurality of debugging request messages by:
deleting standard message headers of the plurality of original debugging request messages; and
adding updated message headers to the plurality of original debugging request messages, wherein the updated message headers comprise a global debug session identifier and the debug session identifiers; and
sending the plurality of debugging request messages.

10. The method of claim 9, further comprising receiving a plurality of debugging response messages, wherein the debugging response messages are in a one-to-one correspondence with debugging request messages.

11. The method of claim 10, further comprising:
deleting message headers of the plurality of debugging response messages, wherein the message headers comprise the debug session identifiers; and
adding the standard message headers to the plurality of debugging response messages.

12. The method of claim 9, wherein before sending the plurality of debugging request messages, the method further comprises establishing a persistent connection to a routing sub-system.

13. The method of claim 9, further comprising discarding a received debug request message when a persistent connection to a routing sub-system fails to be established.

14. The method of claim 9, further comprising disconnecting a connection to the routing sub-system when the plurality of debug sessions is closed.

15. The method of claim 9, wherein deleting the standard message headers comprises deleting debug adapter protocol (DAP) headers of the original debugging request messages.

16. A device, comprising:
a memory configured to store instructions; and
one or more processors coupled to the memory and configured to execute the instructions to:

receive identifiers of a plurality of application sub-modules from a user, wherein a code block comprised in each of the application sub-modules is for implementing a function of an application;

create a plurality of debug sessions, wherein the debug sessions are in a one-to-one correspondence with the application sub-modules; and generate, based on the plurality of debug sessions, a plurality of debugging request messages, wherein each debugging request message is configured to be routed by a routing sub-system to an agent of one of the application sub-modules to request debugging of the code block corresponding to the one of the application sub-modules, and wherein generating the plurality of debugging request message comprises:

deleting standard message headers of a plurality of original debugging request messages; and adding updated message headers to the plurality of original debugging request messages, wherein the updated message headers comprise a global debug session identifier and debug session identifiers.

17. The device of claim 16, wherein the one or more processors are further configured to execute the instructions to generate the plurality of original debugging request messages.

18. The device of claim 17, wherein the one or more processors are further configured to execute the instructions to:

create a global debug session, wherein the global debug session comprises the global debug session identifier and corresponds to the plurality of debug sessions; and add the global debug session identifier to the plurality of original debug request messages to obtain the plurality of debugging request messages.

19. The device of claim 16, wherein the one or more processors are further configured to execute the instructions to receive a plurality of debugging response messages, and wherein the debugging response messages are in a one-to-one correspondence with the debugging request messages.

20. The device of claim 16, wherein the one or more processors are further configured to execute the instructions to delete debug adapter protocol (DAP) headers of the original debugging request messages.

* * * * *